(12) United States Patent
Schmitt et al.

(10) Patent No.: US 9,051,517 B2
(45) Date of Patent: Jun. 9, 2015

(54) TAR RECOVERY FROM GASIFICATION OF A CARBONACEOUS FEEDSTOCK

(75) Inventors: Gerhard Gustav Schmitt, Schmitten (DE); Paul Smit Baumann, Johannesburg (ZA); Johannes Willem Van Zyl, Rosebank (NZ)

(73) Assignee: SASOL TECHNOLOGY (PROPRIETARY) LIMITED, Johannesburg (ZA)

( * ) Notice: Subject to any disclaimer, the term of this patent is extended or adjusted under 35 U.S.C. 154(b) by 0 days.

(21) Appl. No.: 13/982,440

(22) PCT Filed: Dec. 21, 2011

(86) PCT No.: PCT/IB2011/055851
§ 371 (c)(1),
(2), (4) Date: Jul. 29, 2013

(87) PCT Pub. No.: WO2012/104686
PCT Pub. Date: Aug. 9, 2012

(65) Prior Publication Data
US 2013/0303636 A1  Nov. 14, 2013

(30) Foreign Application Priority Data
Feb. 1, 2011  (ZA) .................. 2011/00840

(51) Int. Cl.
*C10G 1/00* (2006.01)
*C07C 1/02* (2006.01)
(Continued)

(52) U.S. Cl.
CPC ... *C10C 1/19* (2013.01); *C10C 1/00* (2013.01); *C10C 1/02* (2013.01); *C10G 2/30* (2013.01);
(Continued)

(58) Field of Classification Search
CPC .............. C10C 1/00; C10C 1/02; C10C 1/19; C10G 2300/1011; C10G 2300/4006; C10G 2300/4012; C10G 2/30; C10G 31/06; C10G 31/09; C10J 2300/0916; C10J 2300/093; C10J 2300/0946; C10J 2300/1659; C10J 3/02; C10J 3/84; C10K 1/06; C10K 1/001; C10K 1/08; C10K 1/10; C10K 3/04; Y02E 50/32
USPC ............................ 518/702; 208/424; 585/240
See application file for complete search history.

(56) References Cited

U.S. PATENT DOCUMENTS 4,036,606 A    7/1977  Zimmermann et al.
4,231,856 A *  11/1980 Romey et al. ............... 208/39
4,295,864 A   10/1981  Rudolph et al.

OTHER PUBLICATIONS

Arno De Klerk, "Fischer-Tropsch refining, Chapter VI (Thesis)", Feb. 1, 2008, pp. 118-195, XP55024982.
(Continued)

*Primary Examiner* — Jafar Parsa
*Assistant Examiner* — Amy C Bonaparte
(74) *Attorney, Agent, or Firm* — Foley & Lardner LLP

(57) ABSTRACT

A method (100) of recovering tar from the gasification of a carbonaceous feedstock includes gasifying (12) a carbonaceous feedstock (14) to produce a raw gas (20) which includes at least CO, $H_2$, tar and entrained solids, the raw gas (20) being at a temperature of at least 250° C. and a pressure of at least 15 bar (g). The raw gas (20) is quenched and washed (22) with a quench liquid (24) producing a solids-containing liquid stream (32) which includes tars, the solids-containing liquid stream being at a temperature of at least 150° C. and a pressure of at least 15 bar (g). Solids (56) are separated (46) from the solids-containing liquid stream (32) to provide a tar recovery stream (102). The tar recovery stream (102) is treated by at least cooling (34) and pressure expansion (36) thereof to produce a tar stream (58).

12 Claims, 2 Drawing Sheets

Figure 1:
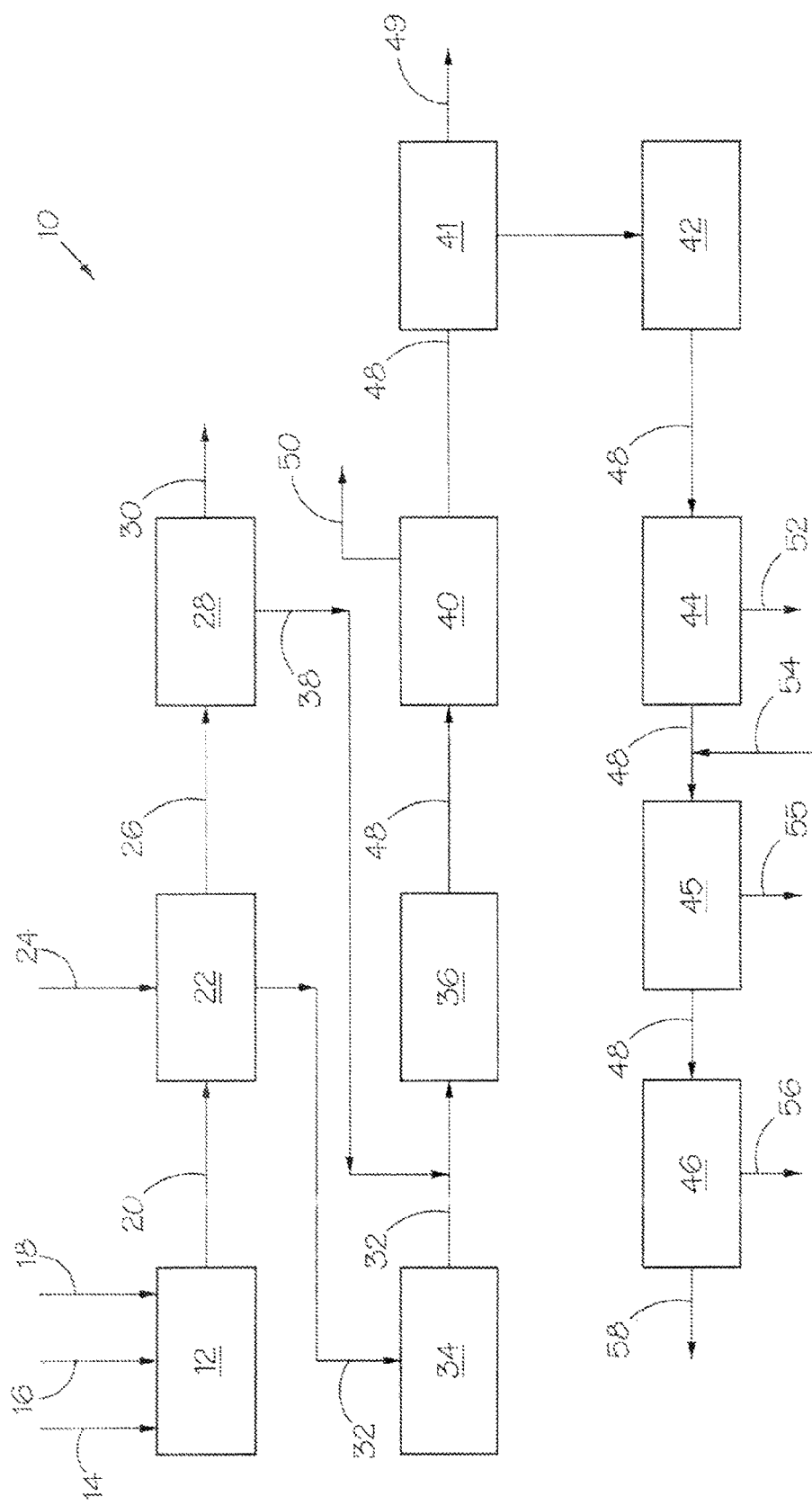

(51) Int. Cl.
*C10G 2/00* (2006.01)
*C10C 1/19* (2006.01)
*C10C 1/00* (2006.01)
*C10C 1/02* (2006.01)
*C10G 31/06* (2006.01)
*C10G 31/09* (2006.01)
*C10J 3/84* (2006.01)
*C10K 1/00* (2006.01)
*C10K 1/06* (2006.01)
*C10K 1/08* (2006.01)
*C10J 3/02* (2006.01)
*C10K 1/10* (2006.01)
*C10K 3/04* (2006.01)

(52) U.S. Cl.
CPC ............... *C10G 31/06* (2013.01); *C10G 31/09* (2013.01); *C10J 3/84* (2013.01); *C10K 1/001* (2013.01); *C10K 1/06* (2013.01); *C10K 1/08* (2013.01); *Y02E 50/32* (2013.01); *C10G 2300/1011* (2013.01); *C10G 2300/4006* (2013.01); *C10G 2300/4012* (2013.01); *C10J 3/02* (2013.01); *C10K 1/10* (2013.01); *C10K 3/04* (2013.01); *C10J 2300/0916* (2013.01); *C10J 2300/093* (2013.01); *C10J 2300/0946* (2013.01); *C10J 2300/1659* (2013.01)

(56) References Cited

OTHER PUBLICATIONS

PCT/IB2011/055851 International Search Report mailed May 3, 2012.

* cited by examiner

TAR RECOVERY FROM GASIFICATION OF A CARBONACEOUS FEEDSTOCK

CROSS-REFERENCE TO RELATED APPLICATIONS

This application is a National Phase of International Application PCT/IB2011/055851, filed Dec. 21,2011,which was published on Aug. 9,2012,as WO2012/104686, which claims benefit of South Africa Application No. 2011/00480, filed Feb. 1,2011,all of which are incorporated herein by reference in their entirety.

This invention relates to tar recovery from gasification of a carbonaceous feedstock. In particular, the invention relates to a method of recovering tar from the gasification of a carbonaceous feedstock.

During the gasification of a carbonaceous feedstock such as coal, a hot synthesis or raw gas is produced which may contain entrained solids such as coal and ash. Depending on the technology used to gasify the coal, it may thus be necessary to quench the raw gas exiting the gasifier to wash out the solids. Typically, a mostly aqueous liquid stream is used as the quench liquid, resulting in a liquid stream separated from the gas which is at a high temperature and pressure and which contains most of the solids previously contained in the gas. This stream is often referred to in the art as "dusty gas liquor". Further cooling of the raw gas will result in more condensed liquid with a comparatively lower solids loading. This condensate stream, often referred to as a "tarry gas liquor", is also still at a relatively high temperature and pressure.

Various gasification product separation processes are, for example, described in Arno De Klerk: "Fischer-Tropsch refining, Chapter VI (Thesis)", February 2008 (2008-02-01), pages 118-195, XP55024982, Pretoria (ZA)—http://upetd.up.ac.za/thesis/available/etd-07282008--30342/unrestricted/04chapter6.pdf In one of the described processes, tar is recovered from the dusty gas liquor and the tarry gas liquor, the dusty gas liquor being combined with the tarry gas liquor and the combined liquor then undergoes a cooling stage and a pressure expansion stage, whereafter the cooled and pressure-relieved liquor is fed to a tar separator and separated into a gas liquor stream, a tar stream and a sludge stream. Another process is also described wherein the dusty gas liquor and the tarry gas liquor are separately cooled and thereafter combined and fed to a tar separation stage comprising primary and secondary tar separators. At the tar separation stage, a tar stream is separated from a gas liquor stream. The tar stream is then fed to a filtration stage and thereafter to a distillation stage.

U.S. Pat. No. 4,036,606 describes the cleaning and recycling of water used to quench raw gas issuing from a gasifier at a pressure of 20 atmospheres. In particular, the quench water is freed from tar and dust constituents in a plurality of hydrocyclones. A concentrate of tar and dust is led off from the hydrocyclones and is subsequently fed to a pressure reducing member in which the pressure is reduced to normal pressure. Thereafter the concentrate is fed to a tar separating unit where it is separated into an aqueous stream and a thick tar-rich stream. The aqueous stream from the separator is recycled to a quench tower where it is used to quench the raw gas.

U.S. Pat. No. 4,295,864 describes a process in which the raw gas produced by gasification of a solid fuel undergoes quenching and further cooling, and at least part of the condensate formed as a result of the cooling of the raw gas undergoes a pressure expansion stage and is thereafter fed to a tar separator, where a liquid phase is separated from a heavy phase containing dust and tar. The liquid phase, which consists mainly of water, is used to cool the raw gas.

It is also known to combine the dusty gas liquor and the tarry gas liquor, after they have been cooled further, and then treating the combined stream in a series of processing steps comprising at least pressure expansion, gravity settling, reheating of a resultant thickened solids-containing tar stream, centrifugal decanting and solids filtration. Diluent oil is sometimes added to the reheated thickened solids-containing tar stream to aid filtration.

A tarry liquid product is produced containing valuable chemical and fuel components with a low solids content. The solids removed from the tar stream however still contain significant amounts of adhered tar which will be disposed of along with the solids and which will therefore be lost as valuable product. The separation of the solids from the tar stream is complicated by the relatively high viscosity of the cooled tar stream.

A method of recovering tar from the gasification of a carbonaceous feedstock which is more efficient and which allows for easier solids separation, would be desirable.

According to the invention, there is provided a method of recovering tar from the gasification of a carbonaceous feedstock, the method including gasifying the carbonaceous feedstock to produce a raw gas which includes at least CO, $H_2$, tar and entrained solids, the raw gas being at a temperature of at least 250° C. and a pressure of at least 15 bar (g);

quenching and washing the raw gas with a quench liquid producing a solids-containing liquid stream which includes tars, the solids-containing liquid stream being at a temperature of at least 150° C. and a pressure of at least 15 bar (g);

filtering solids from the solids-containing liquid stream, at said temperature of at least 150° C. and a pressure of at least 15 bar (g) to provide a solids product and a tar recovery stream; and subsequent to the filtration of the solids from the solids-containing liquid stream, treating the tar recovery stream by at least cooling and pressure expansion thereof to produce a tar stream.

The quench liquid may be an aqueous liquid, so that the solids-containing liquid stream is a tar water emulsion with density and viscosity characteristics resembling that of water at the temperature and pressure of the solids-containing liquid stream. This stream is often referred to as a dusty gas liquor stream in the art.

Filtering the solids from the solids-containing liquid stream thus provides a solids product, which is typically a dry solids product, and said tar recovery stream.

Advantageously, the high temperature and high pressure conditions of the solids-containing liquid stream allow for the removal of solid particulate material, such as ash, more readily than in conditions where the viscosity of the solids-containing liquid stream has been increased as the result of cooling of the solids-containing liquid stream. Filtering solids from the solids-containing liquid stream at the elevated temperature and pressure conditions of the method of the invention thus reduces energy requirements for separation by avoiding the need for reheating and re-pressurisation where the filtration is performed downstream as in prior art processes, and is expected to produce a solid product which includes less tar.

The method may employ one or more candle filters and/or one or more plate-and-frame filters to filter the solids from the solids-containing liquid stream.

Typically, treating the tar recovery stream includes, in addition to cooling and pressure expansion of the tar recovery stream, subsequent density separation of the tar recovery stream to produce said tar stream and at least one further stream. Said at least one further stream may be an aqueous stream. The tar stream may include oil. Typically, the density separation includes a gravity separation step.

The carbonaceous feedstock may be, or may include, coal.

Instead, or in addition, the carbonaceous feedstock may be, or may include carbonaceous waste or biomass.

Gasifying the carbonaceous feedstock may be effected in a fixed bed gasifier, in particular a fixed bed dry bottom gasifier, in the presence of oxygen and steam.

Preferably, the raw gas is at a temperature of at least 300° C., more preferably at least 450° C., e.g. about 530° C.

Preferably, the raw gas is at a pressure of at least 20 bar (g), more preferably at least 25 bar (g), e.g. 29 bar (g).

Preferably, the solids-containing liquid stream is at a temperature of at least 160° C., more preferably at least 180° C., e.g. about 200° C.

Preferably, the solids-containing liquid stream is at a pressure of at least 20 bar (g), more preferably at least 25 bar (g), e.g. about 28 bar (g).

The method may include, subsequent to the quenching and washing of the raw gas, further cooling of the raw gas to condense condensable components from the raw gas, producing a condensed liquid stream. This condensed liquid stream has a lower solids load than the solids-containing liquid stream and is often referred to as a tarry gas liquor stream in the art.

Typically, the condensed liquid stream is at a pressure of at least 15 bar (g), preferably at least 20 bar (g), more preferably at least 25 bar (g), e.g. 27.5 bar (g).

Typically, the condensed liquid stream is at a temperature of at least 120° C., preferably at least 140° C., e.g. 162° C.

The method may include combining at least a portion of the condensed liquid stream with the solids-containing liquid stream, prior to filtering solids from a combined solids-containing liquid stream thus produced to provide said tar recovery stream.

Instead, or in addition, the method may include combining at least a portion of the condensed liquid stream with the tar recovery stream at a selected point during the treatment of the tar recovery stream. In one embodiment of the invention, the condensed liquid stream is thus combined with the tar recovery stream downstream of the cooling of the tar recovery stream but upstream of the pressure expansion of the tar recovery stream.

Advantageously, the method of the invention may avoid the need for an oil or diluent to be added to the solids-containing liquid stream, or to the combined solids-containing liquid stream, prior to filtering solids from the solids-containing liquid stream or from the combined solids-containing liquid stream to provide said tar recovery stream. In other words, an undiluted solids-containing liquid stream or an undiluted combined stream may be subjected to a filtration step to separate solids therefrom to provide said tar recovery stream.

The invention extends to a hydrocarbon synthesis process which includes
treating raw gas obtained from gasification of carbonaceous material to produce synthesis gas suitable for hydrocarbon synthesis; and
synthesising hydrocarbons or chemicals from the synthesis gas;
the process further including recovering tar from the raw gas according to the method hereinbefore described.

The hydrocarbons may be synthesised in one or more Fischer-Tropsch hydrocarbon synthesis stages, which may be entirely conventional.

Treating the raw gas obtained from gasification of a carbonaceous material may include typical or conventional treatment steps for cleaning and/or adjusting the composition of raw gas obtained from the gasification of a carbonaceous material such as coal, for example sweetening, methanol washing or Rectisol (trade name), $CO-CO_2$ shifting or hydrogen addition.

The hydrocarbon synthesis process thus includes gasifying a carbonaceous feedstock or material, e.g. coal, to produce said raw gas. Typically, the hydrocarbon synthesis process thus employs at least one gasifier to gasify the carbonaceous material. The process may include recycling said solids separated from the solids-containing liquid stream to said at least one gasifier employed to gasify the carbonaceous material. The solids product may be admixed with carbonaceous feedstock or combined in another way with the carbonaceous feedstock during preparation of the carbonaceous feedstock and in this manner recycled to the gasifier.

Figure 2:
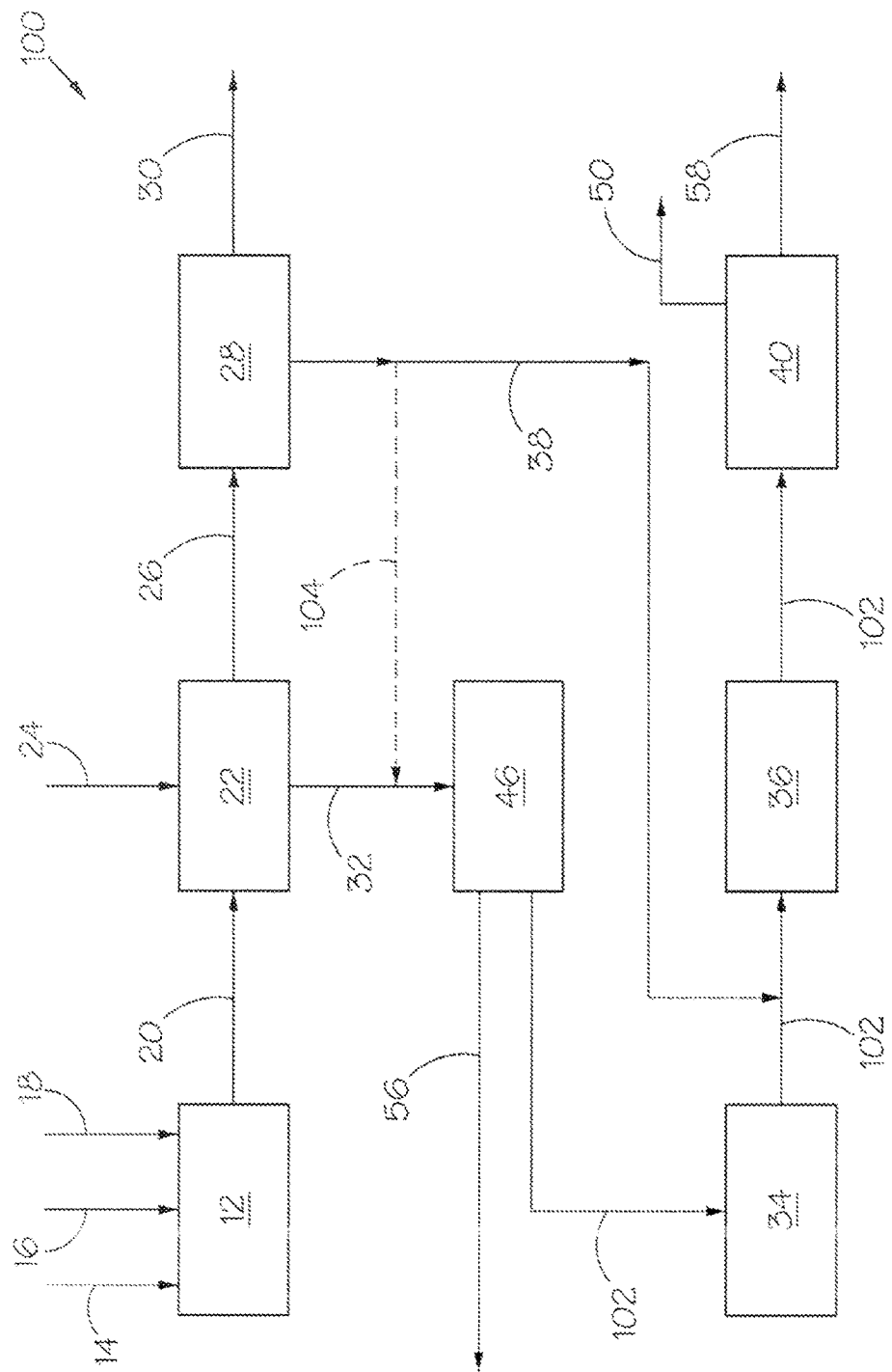

The invention will now be described, by way of example, with reference to the accompanying diagrammatic drawings in which FIG. 1 shows a conventional method of recovering tar from the gasification of a carbonaceous feedstock; and FIG. 2 shows one embodiment of a method in accordance with the invention of recovering tar from the gasification of a carbonaceous feedstock.

Referring to FIG. 1 of the drawings, reference numeral 10 generally indicates a conventional or prior art method of recovering tar from the gasification of a carbonaceous feedstock, and in particular coal.

The method 10 includes a gasification stage 12 with a coal feedstock line 14, a steam line 16 and an oxygen line 18 leading into the gasification stage 12.

From the gasification stage 12, a hot raw gas line 20 leads to a quenching stage 22, which is also fed by a quench liquid line 24. A quenched raw gas line 26 leads from the quenching stage 22 to a cooling stage 28 from which a cooled raw gas line 30 leaves.

A dusty gas liquor line 32 leads from the quenching stage 22 to a cooling stage 34 and from the cooling stage 34 to a pressure expansion stage 36. Prior to entering the pressure expansion stage 36, the dusty gas liquor line 32 is joined by a tarry gas liquor line 38 leading from the cooling stage 28.

The pressure expansion stage 36 is followed in series by a gravity separation stage 40, a solids removal stage 41 employing a dump bin with a conveyor type scraper to remove solids from tar, a reheating stage 42, a centrifugal decanting stage 44, a forced feed evaporator stage 45 and a filtration stage 46. A tar recovery line 48 leads from the pressure expansion stage 36 to the gravity separation stage 40 and from there to the solids removal stage 41, the reheating stage 42, the centrifugal decanting stage 44, the forced feed evaporator stage 45 and the filtration stage 46. Further process lines required for the method 10 is an aqueous liquid line 50 leaving the gravity separation stage 40, a solids line 52 leaving the centrifugal decanting stage 44, a dilution oil line 54 joining the tar recovery line 48 before the tar recovery line 48 enters the forced feed evaporator stage 45, a water line 55 leaving the forced feed evaporator stage 45 and a dry solids line 56 and a tar line 58 leaving the filtration stage 46.

In the conventional method 10 illustrated in FIG. 1, coal is gasified in the presence of steam and oxygen in the gasification stage 12 in a fixed bed dry bottom gasifier, producing ash (not shown) and hot raw gas which is withdrawn by means of the hot raw gas line 20. The hot raw gas is typically at a temperature of about 550° C. and a pressure of about 29 bar (g) and includes entrained solids such as coal and ash. Major components of the hot raw gas are CO, $CO_2$, $CH_4$ and $H_2$ and the hot raw gas also includes tar.

In the quenching stage 22, the hot raw gas is quenched and then cooled to a temperature of about 180° C. by means of a mostly aqueous liquid fed by means of the quench liquid line 24. In the quenching stage 22, the hot raw gas is thus cooled and solids and some of the tar are washed from the raw gas, producing dusty gas liquor. The dusty gas liquor, at a temperature of about 200° C. is fed by means of the dusty gas liquor line 32 to the cooling stage 34 where the dusty gas liquor is cooled further to a temperature of about 71° C.

Quenched raw gas leaves the quenching stage 22 by means of the quench raw gas line 26 and is further cooled in the cooling stage 28, producing cooled raw gas at a temperature of about 40° C. which is withdrawn by means of the cooled raw gas line 30. The cooled raw gas, after further treatment, e.g. sweetening and CO—$CO_2$ adjustment, is a suitable synthesis gas for use in processes such as Fischer-Tropsch hydrocarbon synthesis.

In the cooling stage 34, condensable components of the raw gas are condensed producing a tarry gas liquor at a temperature of about 160° C. which is withdrawn by means of the tarry gas liquor line 38.

Dusty gas liquor from the cooling stage 34 and tarry gas liquor from the cooling stage 28 are combined to form a tar recovery stream which is fed to the pressure expansion stage 36. In the pressure expansion stage 36, the pressure of the tar recovery stream is expanded to about atmospheric pressure e.g. using a pressure expansion drum, before the tar recovery stream is fed by means of the tar recovery line 48 to the gravity separation stage 40. Typically, although not shown, some water and other light components are flashed off in the pressure expansion stage 36 and removed.

In the gravity separation stage 40 (typically comprising primary and secondary gravity tar separators), conventional gravity separation techniques are used to produce an aqueous liquid stream which is withdrawn by means of the aqueous liquid line 50 and a thickened tar stream which is withdrawn by means of the tar recovery line 48. The gravity separation stage 40 may also produce an oil stream (not shown), which is removed. The thickened tar stream is transported to the solids removal stage 41 where a conveyer type scraper removes some (about a third) of the solids from the thickened tar stream via line 49 before the thickened tar stream is reheated in the reheating stage 42 to a temperature of about 80° C., and subjected to centrifugal decanting in the centrifugal decanting stage 44 to produce a solids stream which is withdrawn by means of the line 52. The remainder of the tar stream is then pumped to the forced feed evaporation stage 45 to remove any remaining water by means of line 55 before the tar stream is routed to the filtration stage 46 by means of the tar recovery line 48.

Before entering the forced feed evaporation stage 45, dilution oil is added to the tar stream by means of the dilution oil line 54 to aid filtration. In the filtration stage 46, the tar stream is filtered to produce a dry solids product withdrawn by means of the dry solids line 56 and a tar product withdrawn by means of the tar line 58. Unfortunately however, the dry solids product still contains significant amounts of adhered tar which is then disposed of along with the solids, leading to a loss of valuable product.

Referring to FIG. 2 of the drawings, reference numeral 100 generally indicates an improved method in accordance with the invention of recovering tar from the gasification of a carbonaceous feedstock, such as coal. In the method 100, process features corresponding to process features of the method 10 are indicated by the same reference numerals, unless otherwise indicated.

As will be noted, a major distinguishing feature of the method 100 is that the filtration stage 46 is located between the quenching stage 22 and the cooling stage 34, i.e. upstream of the cooling stage 34, the pressure expansion stage 36 and the gravity separation stage 40. A tar recovery line 102 thus leads from the filtration stage 46 to the cooling stage 34, from the cooling stage 34 to the pressure expansion stage 36, and from the pressure expansion stage 36 to the gravity separation stage 40.

In the method 100, dusty gas liquor withdrawn from the quenching stage 22, at a temperature of about 200° C. and a pressure of about 26 bar (g), is subjected to filtration in the filtration stage 46, to produce a tar recovery stream and a dry solids product stream. As is the case with the method 10, the dry solids product is withdrawn by means of the dry solids line 56. A dual filter (alternating operating) arrangement as described in ZA 2002/3809 can, for example, be used to filter the dusty gas liquor.

Advantageously, at about 200° C. and about 26 bar (g), the dusty gas liquor, which is essentially a water tar emulsion containing suspended particulate material, has density and viscosity characteristics closely resembling that of water at the same temperature and pressure. This allows for the removal of the suspended particulate material much more readily at acceptable filtration rates than in the case of a cooled, thickened tar phase as in the method 10. Energy requirements for separation of solids from the tar recovery stream is thus reduced as the energy already contained in the dusty gas liquor is used, avoiding the need for reheating and re-pressurisation where the filtration step 46 is performed later, as in the method 10.

In the method 100, the tar recovery stream from the filtration stage 46 is fed by means of a tar recovery line 102 to the cooling stage 34, where the tar recovery stream is cooled to a temperature of about 71° C. Thereafter, the tar recovery stream is expanded in the pressure expansion stage 36 to near-atmospheric pressure and subjected to gravity separation in the gravity separation stage 40, in conventional manner.

As in the method 10, the method 100 also produces condensed tarry gas liquor which is withdrawn from the cooling stage 28 by means of the tarry gas liquor line 38. If desired, the tarry gas liquor can be combined with the dusty gas liquor and subjected to filtration in the filtration stage 46, as indicated by the optional flow line 104. Alternatively, the tarry gas liquor, or a portion thereof, can be combined with the cooled tar recovery stream from the cooling stage 34 for purposes of recovering tar in the gravity separation stage 40.

The method 100, as illustrated, has a lower energy consumption than the method 10 and provides for more efficient tar, oil and aqueous phase separation due to the absence of solids in the tar recovery stream. This provides opportunity for debottlenecking of current equipment or reduction in capital for new plant designs. Advantageously, the dry fine solids product produced by the method 100 is suitable for mixing with fine coal as feed to, for example, steam boiler plants, or even for use in coal feedstock preparation to gasification units. As the dry solids product is essentially tar-free it is easily transportable by means of commercial pneumatic equipment as opposed to conveyer belt systems, which are required for conventional methods, such as the method 10. It is furthermore expected that there will be a reduction in maintenance on downstream equipment due to the absence of the abrasive solids in the tar recovery stream and it is also expected that it may be possible to employ the method 100 without the use of dilution oil or solvent to assist in the separation of the solids material from the tar recovery stream. In addition and advantageously, the method 100 does not require the solids removal stage 41, the reheating stage 42, or the centrifugal decanting stage 44, although a forced feed evaporation stage downstream from the gravity separation stage 40 may be required to produce an essentially water-free tar product.

EXAMPLE

By way of illustrative example, a computer process simulation was performed to show the anticipated pump duty benefits of the method 100 of the invention over the conventional, prior art method 10. Isoquinaline and guaiacol were used to approximate tar components, and water was used to approximate the aqueous phase. Dissolved synthesis gas components were also estimated. It will be clear to those skilled in the art that there will be some degree of inaccuracy in the calculations as these streams are highly complex streams containing many components and are thus difficult to model.

The table below shows a comparison between a base case configuration in accordance with the conventional prior art method 10 as described, and two implementation scenarios, case A and case B, in accordance with the method 100 of the invention. Case A has a similar filter configuration to the base case, i.e. the tar containing stream is pumped through a leaf filter to overcome the pressure drop associated with the leave filter. In the base case it is necessary to pump the tar-containing stream from a low pressure through the leaf filter, but in case A the leaf filter is provided on a high temperature/high pressure tar-containing stream and thus a relatively smaller pumping duty is required to overcome the pressure drop across the leaf filter compared with the base case. Referring to the table, is it clear that by positioning the leaf filter on the high temperature/high pressure stream (case A) a 45% reduction in the pressure drop (i.e. a dP of 1.8 bar compared to a dP of 3.9 bar) over the leaf filter compared to the base case is achieved. There is a concomitant saving in pump duty.

|  | Units | Base Case | Case A | Case B |
| --- | --- | --- | --- | --- |
| Pressure | bar | 1 | 26 | 26 |
| Temperature | ° C. | 80 | 200 | 200 |
| Filter dP | bar | 3.9 | 1.8 | 1.8 |
| Normalised pump duty | [kW/kW] | 1 | 0.55 | 0 |
| Duty reduction | % | — | 45 | 100 |

Since the tar containing stream is already available at a high pressure which can supply the necessary driving force across the leaf filter, a configuration can be derived that uses the inherent pressure of the stream such that no pump is required. This is illustrated by case B. As for case A, the pressure drop over the filter is reduced by 45% over the base case, the difference being that no pumping duty is required in case B at all because the entire driving force necessary is supplied by the pressure of stream. In the base case configuration, this energy would not have been utilised as the tar-containing stream would have been expanded before being routed to a gas liquor separation process as hereinbefore described.

Installing the filtration step on the high temperature tar-containing stream thus results in a significant saving in pump duty. It may even be possible that no pumping is required in the filtration section during normal filtration (case B) if the system is designed to utilise the pressure of the stream to be filtered.

A minimal amount of pumping duty will, however, still be required during backwash operations for Case A and Case B to remove the filter cake form the filter. Since a clean stream required for backwashing would still be available at an elevated temperature and pressure, a substantial pump duty saving over the base case would still materialise.

The Applicant expects many other benefits such as reduced erosion on equipment, reduced product losses and improved separation that cannot presently easily be quantified.

The invention claimed is:

1. A method of recovering tar from the gasification of a carbonaceous feedstock, the method comprising:
    (a) gasifying the carbonaceous feedstock to produce a raw gas comprising at least CO, $H_2$, tar and entrained solids, the raw gas being at a temperature of at least 250° C. and a pressure of at least 15 bar (g);
    (b) quenching and washing the raw gas with an aqueous quench liquid to produce a solids-comprising liquid stream which is a tar water emulsion, the solids-comprising liquid stream being at a temperature of at least 150° C. and a pressure of at least 15 bar (g);
    (c) filtering solids from the tar water emulsion, at said temperature of at least 150° C. and said pressure of at least 15 bar (g), to provide a solids product and a tar recovery stream; and
    (d) treating the tar recovery stream by at least cooling and pressure expansion thereof to produce a tar stream.

2. The method according to claim 1, wherein treating the tar recovery stream comprises, in addition to cooling and pressure expansion of the tar recovery stream, subsequent density separation of the tar recovery stream to produce said tar stream and at least one further stream.

3. The method according to claim 1, wherein the carbonaceous feedstock is, or comprises, coal, carbonaceous waste or biomass.

4. The method according to claim 1, wherein gasifying the carbonaceous feedstock is effected in a fixed bed gasifier in the presence of oxygen and steam.

5. The method according to claim 1, further comprising, subsequent to the quenching and washing of the raw gas, further cooling of the raw gas to condense condensable components from the raw gas, to produce a condensed liquid stream, and combining at least a portion of the condensed liquid stream with the solids-containing liquid stream, prior to filtering solids from a combined solids-containing liquid stream thus produced to provide said tar recovery stream.

6. The method according to claim 1, further comprising, subsequent to the quenching and washing of the raw gas, further cooling of the raw gas to condense condensable components from the raw gas, to produce a condensed liquid stream, and combining at least a portion of the condensed liquid stream with the tar recovery stream at a selected point during the treatment of the tar recovery stream.

7. The method according to claim 1, wherein no oil or diluent is added to the solids-containing liquid stream, prior to filtering solids from the solids-containing liquid stream to provide said tar recovery stream.

8. The method according to claim 5, wherein no oil or diluent is added to the combined solids-containing liquid stream prior to filtering solids from the combined solids-containing liquid stream to provide said tar recovery stream.

9. The method according to claim 1, wherein the solids-comprising liquid stream is at a temperature of at least 160° C. and a pressure of at least 20 bar (g).

10. A hydrocarbon synthesis process, the process comprising:
- (a) treating raw gas obtained from gasification of carbonaceous material to produce a synthesis gas suitable for hydrocarbon synthesis;
- (b) synthesising hydrocarbons or chemicals from said synthesis gas; and
- (c) recovering tar from the raw gas according to the method of claim 1.

11. The process according to claim 10, wherein the hydrocarbons are synthesised in one or more Fischer-Tropsch hydrocarbon synthesis stages.

12. The process according to claim 10, further comprising gasifying a carbonaceous feedstock or material to produce said raw gas by employing at least one gasifier, and recycling said solids separated from the solids-containing liquid stream to said at least one gasifier employed to gasify the carbonaceous material.

\* \* \* \* \*